J. F. WOLLESEN.
REVERSING GEAR.
APPLICATION FILED DEC. 8, 1919.
1,394,131.
Patented Oct. 18, 1921.
2 SHEETS—SHEET 1.
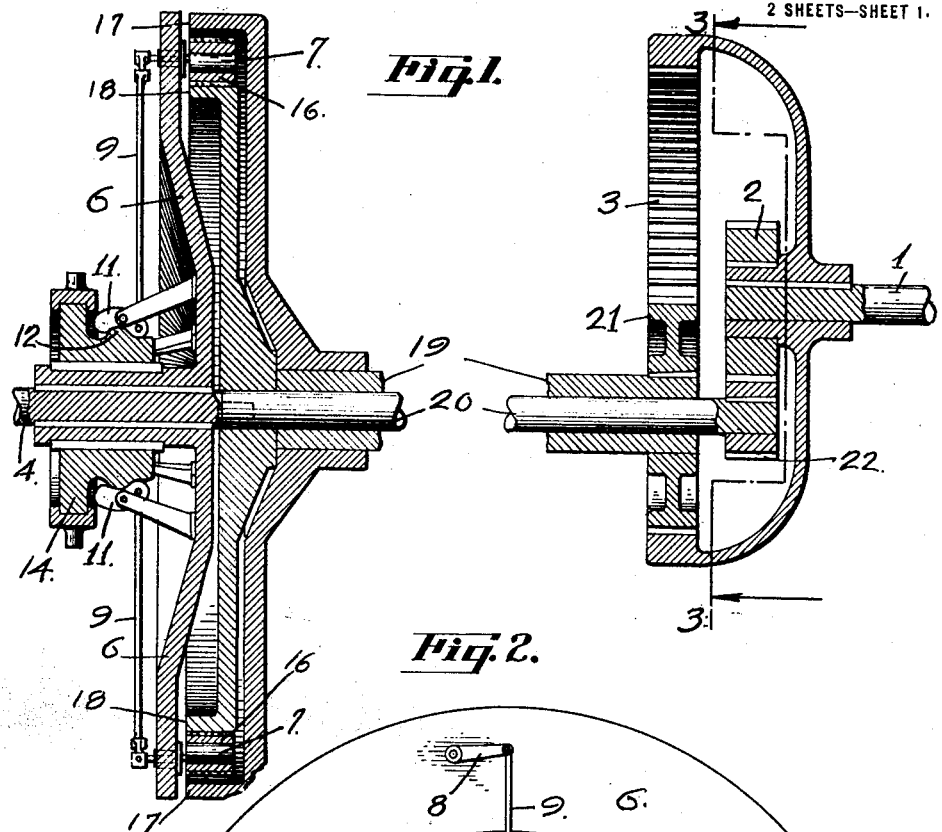
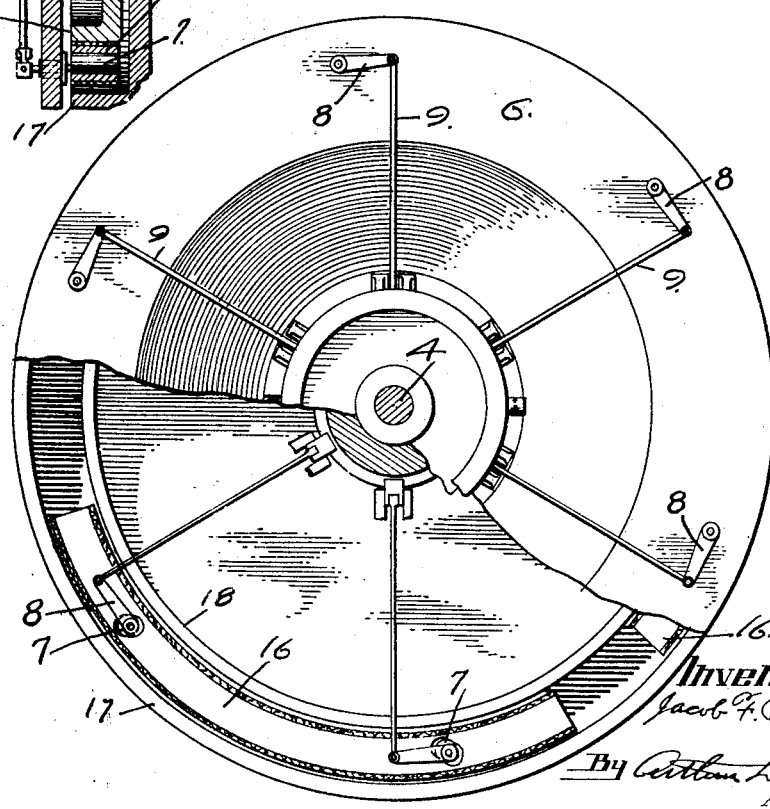

J. F. WOLLESEN.
REVERSING GEAR.
APPLICATION FILED DEC. 8, 1919.

1,394,131.

Patented Oct. 18, 1921.
2 SHEETS—SHEET 2.

Inventor
Jacob F. Wollesen
By Arthur L. Slee.
Atty.

UNITED STATES PATENT OFFICE.

JACOB F. WOLLESEN, OF LOCKWOOD, CALIFORNIA.

REVERSING-GEAR.

1,394,131.  Specification of Letters Patent.  Patented Oct. 18, 1921.

Application filed December 8, 1919. Serial No. 343,420.

*To all whom it may concern:*

Be it known that I, JACOB F. WOLLESEN, a citizen of the United States, residing in Lockwood, in the county of Monterey and State of California, have invented a certain new and useful Improvement in a Reversing-Gear, of which the following is a specification.

My invention relates to improvements in reversing gears wherein nested rotating elements operate in conjunction within oppositely faced gears on a driven element to rotate said element in either direction and at the same rate of speed.

The primary object of the present invention is to provide a new and improved gear reversing mechanism.

A further object of the present invention is to provide a new and improved device of the character described wherein a driving element may rotate a driven element either alined therewith or at right angles thereto.

A still further object of the improved device is to provide a new and improved device of the type specified wherein only one set of gears may be connected to the driving element at one time.

It is also an object to provide an improved device as described of a simple and economical construction and having a maximum efficiency.

I accomplish these objects by means of the improved device disclosed in the drawings forming a part of the present specification wherein like characters of reference are used to designate similar parts throughout the said specification and drawings, and in which:

Figure 1 is a broken longitudinal sectional view of my improved device;

Fig. 2 is a broken left hand elevation of Fig. 1;

Figure 3:
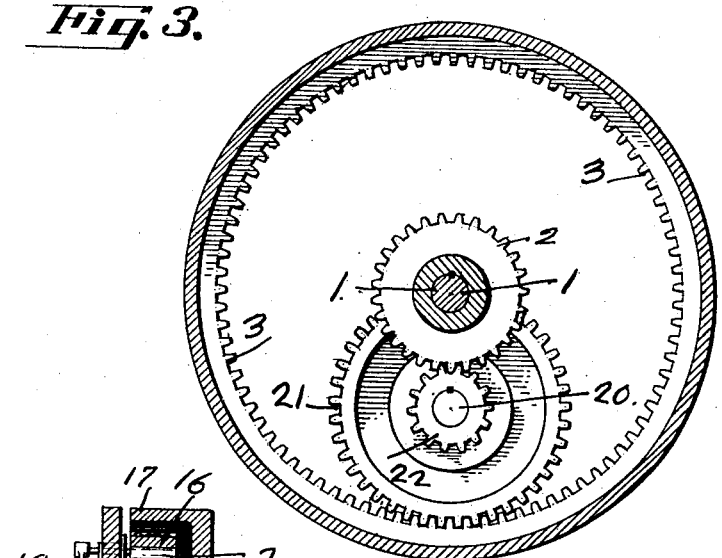
Fig. 3 is a transverse sectional view taken on line 3—3 of Fig. 1 in the direction indicated.

Referring to the drawings the numeral 1 is used to designate a driven element or shaft having oppositely faced gears 2 and 3 connected thereto.

A driving element or shaft 4 is provided with a disk 6 having cams 7 rotatably mounted near the periphery thereof, said cams being operable by means of levers 8 which are in turn operated by rods 9 actuated by double ended cams 11 riding over an annular flange or ridge 12 upon a collar 14 feathered to the driving shaft 4.

The cams 7 are operated to move a plurality of friction shoes outwardly to frictionally engage and rotate an annular flange 17 or inwardly to engage a similar flange 18, connected to a pair of nested connecting elements 19 and 20 respectively, alined with the driving shaft 4.

The connecting element 19 is provided with a gear 21 which is constantly in mesh with the gear 3, while the element 20 is provided with a gear 22 constantly in mesh with the gear 2 of the driven element 1. The gears 3 and 21 are of the same gear ratio as the gear ratio of the gears 2 and 22 so that the same rate of speed in opposite directions may be imparted to the driven element 1.

In operation the collar 14 is moved longitudinally upon the shaft 4 to actuate the cams 7 and shoes 16 operatively connected thereto in an outward direction to engage the outer flange 17 and thereby rotate the gears 21 and 3 and the shaft or driven element 1 in the same direction as the driving shaft 4 and at the same speed, the ratio of the gears 3 and 21 being equal to the ratio of the gears 2 and 22.

When the collar 14 is operated in the opposite direction the shoes 16 are actuated to move inwardly and engage the inner annular flange 18 and the element 20 and gear 21 thereon are then operated to rotate the gear 3 and driven element 1 in the opposite direction and at the same rate of speed as the driving shaft 4, the gears 21 and 3 being also of the same gear ratio as the ratio of the gears 22 and 2.

Figure 4:
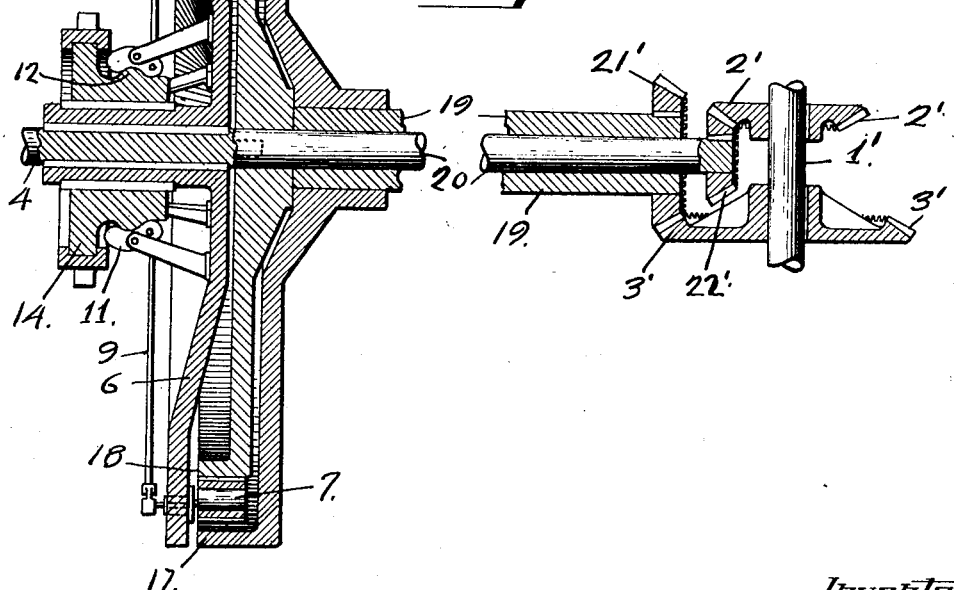
Fig. 4 is a broken longitudinal sectional view of a modified form of the invention.

The form of the invention hereinbefore described is for a driven element arranged parallel with the driving element. In Fig. 4 of the drawings I have disclosed a modified form of the invention wherein the driven element or shaft 1' is arranged at right angles to the driving shaft 4 and is provided with two oppositely faced bevel gears 2' and 3' engaged by bevel pinions 21' and 22' mounted upon the nested connecting elements 19 and 20 respectively.

The operation of this modification is similar to the hereinbefore described mechanism excepting that bevel pinions are utilized to drive a shaft or driven element at right angles to the driving element instead of using spur gears to drive a driven element arranged parallel with the driving element.

It is obvious that either of the hereinbefore described reversing mechanisms have a practically unlimited number of uses. Briefly, they may be used with any device where a reversal of movement is required at the same or different speed, by changing the ratio of the driving gears, to a parallel or transverse shaft.

Having thus described my invention, what I claim as new and desire to secure by Letters Patent is:

1. A reversing mechanism comprising a driven element; oppositely faced gears connected to the driven element; a second set of gears in mesh with the first mentioned set, each meshing set being of the same ratio; a driving element; a pair of nested connecting elements connected to the second set of gears and alined with the driving element; and means for operatively connecting either connecting element with the driving element whereby the driven element may be driven in either direction at the same speed.

2. A reversing mechanism comprising a driven element; oppositely faced gears connected to the driven element; a driving element; a pair of nested connecting elements alined with the driving element; a gear mounted upon each connecting element and meshing with one of the oppositely faced gears on the driven element; and means for connecting only one of the nested elements at one time with the driving element whereby said driven element may be rotated in either direction.

3. A reversing mechanism comprising a driven element; oppositely faced gears mounted upon the driven element; a driving element; a pair of nested connecting elements alined with the driving element and each provided with an annular flange arranged concentric with said driving element; a gear mounted upon each nested sleeve and meshing with one of the gears on the driven element to provide two gear trains of the same gear ratio; friction blocks connected to the driving element; and means for operating the friction blocks to engage either one of the annular flanges on the sleeves whereby the driven element may be rotated in either direction and at the same rate of speed.

In witness whereof I hereunto set my signature.

JACOB F. WOLLESEN.